US011799734B1

(12) United States Patent
Strong et al.

(10) Patent No.: US 11,799,734 B1
(45) Date of Patent: Oct. 24, 2023

(54) DETERMINING FUTURE USER ACTIONS USING TIME-BASED FEATURIZATION OF CLICKSTREAM DATA

(71) Applicant: FMR LLC, Boston, MA (US)

(72) Inventors: Emily Strong, Quincy, MA (US); Serdar Kadioglu, Somerville, MA (US); Manny Jain, Bengaluru (IN); Filip Michalsky, Medford, MA (US); Alex Arias-Vargas, Foxboro, MA (US); Siddharth Narayanan, Cambridge, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/746,728

(22) Filed: May 17, 2022

(51) Int. Cl.
*H04L 67/146* (2022.01)
*H04L 67/50* (2022.01)
*H04L 41/16* (2022.01)
*G06N 20/20* (2019.01)

(52) U.S. Cl.
CPC ............. *H04L 41/16* (2013.01); *G06N 20/20* (2019.01); *H04L 67/146* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 8,412,665 B2 | 4/2013 | Wang et al. | |
| 9,800,727 B1 * | 10/2017 | Chakrabarty | ........... H04L 67/02 |
| 10,825,072 B2 | 11/2020 | Barkan et al. | |
| 11,068,935 B1 | 7/2021 | White et al. | |
| 11,379,293 B1 * | 7/2022 | Sun | ..................... G06F 11/2263 |
| 2010/0138370 A1 | 6/2010 | Wu et al. | |

(Continued)

OTHER PUBLICATIONS

Dong, Cailing. "Advances in Customer Intent Prediction and Pattern Discovery", Capitalone.com, Oct. 14, 2020 [retrieved on Jun. 2, 2023], Retrieved from the Internet: <URL: https://www.capitalone.com/tech/software-engineering/clickstream-data-advances-in-customer-intent-prediction/>. (Year: 2020).*

(Continued)

*Primary Examiner* — Kevin T Bates
*Assistant Examiner* — Dae Kim
(74) *Attorney, Agent, or Firm* — Cesari & McKenna, LLP

(57) ABSTRACT

Methods and apparatuses are described for determining future user actions using time-based featurization of clickstream data. A server captures clickstream data corresponding to web browsing sessions and converts the clickstream data into tokens by identifying each unique URL and parsing each unique URL into tokens. The server generates a frequency matrix based upon the tokens, and generates a latent feature vector for each URL in the session based upon the frequency matrix. The server merges the latent feature vectors and the clickstream data into an aggregate clickstream vector set for a user. The server assigns time-decayed weight values to each latent feature vector in the aggregate clickstream vector set. The server combines the time-decayed latent feature vectors to generate a clickstream embedding for the user, and executes a machine learning model using the clickstream embedding to generate one or more predicted actions of the user.

20 Claims, 5 Drawing Sheets

(56) References Cited

U.S. PATENT DOCUMENTS

| | | | |
|---|---|---|---|
| 2011/0213655 A1* | 9/2011 | Henkin | G06Q 30/00 |
| | | | 707/E17.061 |
| 2020/0175522 A1* | 6/2020 | Zhang | G06Q 10/06393 |
| 2021/0142196 A1* | 5/2021 | R | G06F 16/258 |
| 2021/0182697 A1* | 6/2021 | Singh | G06F 16/258 |
| 2021/0264202 A1* | 8/2021 | Kalluri | G06F 18/23 |

OTHER PUBLICATIONS

SalahEldeen, Hany M. "Detecting, Modeling, and Predicting User Temporal Intention", Dissertation, Old Do (Year: 2015).*

Sheil, Humphrey. "Discovering user intent in E-commerce clickstreams", PhD Thesis, Cardiff University, 2019 [retrieved on Jun. 2, 2023], Retrieved from the Internet: <URL: https://orca.cardiff.ac.uk/id/eprint/120613/>. (Year: 2019).*

Ng, K. H. "Prediction of learning outcomes via clickstream data using machine learning", Doctoral thesis, Nanyang Technological University, 2020 [retrieved on Jun. 2, 2023], Retrieved from the Internet: <URL: https://hdl.handle.net/10356/147631>. (Year: 2020).*

Zaloudek, Jan. "User Behavior Clustering and Behavior Modeling Based on Clickstream Data", May 2018 [retrieved on Jun. 2, 2023], Retrieved from the Internet: <URL: https://dspace.cvut.cz/bitstream/handle/10467/76774/F3-DP-2018-Zaloudek-Jan-ctuthesis_master%20%2811%29.pdf>. (Year: 2018).*

Amrich, J., "Modeling on-line user behavior using URL embedding," Czech Technical University in Prague, Diploma thesis, May 2017, 77 pages.

Sheil, H., "Discovering User Intent in E-commerce Clickstreams," Cardiff University, Ph.D. thesis, Feb. 2019, 202 pages.

* cited by examiner

| URL | Tokens |
|---|---|
| http://oltx.abc.com/ftgw/fbc/ofsummary/summary | http oltx abc com ftgw fbc ofsummary summary |
| http://toa.abc.com/ftgw/toa/transfer/setupassettransfer | http toa abc com ftgw toa transfer setupassettransfer |
| ... | ... |
| http://toa.abc.com/ftgw/appt/schedule/newaccount | http toa abc com ftgw appt schedule newaccount |

| Token | TF | IDF |
|---|---|---|
| ftgw | 2 | 0.1 |
| fbc | 1 | 0.2 |
| ofsummary | 1 | 0.2 |
| summary | 1 | 0.35 |
| toa | 2 | 0.15 |
| transfer | 1 | 0.3 |
| setupassettransfer | 1 | 0.45 |
| ... | ... | ... |
| appt | 1 | 0.25 |
| schedule | 1 | 0.35 |
| newaccount | 1 | 0.3 |

FIG. 4

| User Identifier | URL | Time Difference (Δt) | Feature Vector |
|---|---|---|---|
| A00034522 | http://oltx.abc.com/ftgw/fbc/ofsummary/summary | 2 days ago | [0.2, 0.2, 0.35, 0.3, …] |
| A00034522 | http://toa.abc.com/ftgw/toa/transfer/setupassettransfer | 4 days ago | [0.3, 0.45, 0.4, …] |
| … | … | … | … |
| A00034522 | http://toa.abc.com/ftgw/appt/schedule/newaccount | 9 months ago | [0.25, 0.35, 0.3, …] |

FIG. 5

DETERMINING FUTURE USER ACTIONS USING TIME-BASED FEATURIZATION OF CLICKSTREAM DATA

TECHNICAL FIELD

This application relates generally to methods and apparatuses, including computer program products, for determining future user actions using time-based featurization of clickstream data.

BACKGROUND

Typical customer service environments are reactive, meaning that the systems designed to receive and handle customer service requests do not have any significant prior knowledge of the intent behind an incoming customer interaction. As one example, routing of inbound calls in a typical customer service setting is conducted without any predictive understanding of the caller's intent or reason behind the call. Some call centers simply route calls in a first-in-first-out (FIFO) manner to available customer service representatives (CSRs) without regard to the reason for the call or the skillset of the individual CSRs—as some CSRs may be better equipped or experienced to handle specific types of calls. In this scenario, it is not uncommon for a single call to be manually rerouted to multiple different CSRs before reaching an appropriate representative. As a result, the average time for calls on hold and for support resolution increases, adversely affecting the customer experience.

In another scenario, some customer service systems are configured to obtain just-in-time information about the caller and/or call, usually by leveraging automated systems such as interactive voice response (IVR) technology or automated virtual assistants, and then determine how to handle the customer service request based upon this information. In these examples, the IVR prompts or virtual assistant messages are typically limited to predefined, broad options and generally do not accurately reflect the specific intent behind a customer's call. As a result, it may take several minutes for a customer to navigate an IVR menu or respond to virtual assistant messages in order to reach a live CSR, and yet the CSR may still have to request or verify such information from a caller before the CSR can fully understand why the customer is calling and formulate an appropriate response. Furthermore, advanced planning, configuration, and resource management for customer service systems is often deficient due to the lack of ability to anticipate and/or predict incoming demand for resources.

In the above scenarios, the customer service platforms and applications are not configured to obtain any pre-interaction knowledge about the potential intent behind the incoming customer service requests. However, in many instances, a customer contacts a customer service center after first interacting with the same organization in another capacity, namely, via web browsing. For example, a customer may use his computing device to navigate to the organization's website and search or click for information that may be responsive to his needs—resulting in the generation of clickstream data associated with the customer's browsing session. Such clickstream data contains a myriad of information, such as URLs, search queries, metadata, and the like that is potentially relevant to future interactions with the same customer or other, similar customers. Upon obtaining some information (or being unable to fully obtain the desired information) from the website, the customer may initiate a customer service request to one or more service platforms of the organization for additional assistance.

Some existing computer systems have attempted to apply machine learning techniques to collected clickstream data in order to better understand customer intent and predict whether a given customer will initiate a customer service request or interaction in the near future. One approach used by existing systems is one-hot encoding of clickstream data. In this approach, computer systems typically convert webpages visited by customers during browsing sessions into one-hot vectors that are used to predict future actions. However, the one-hot encoder technique has several drawbacks. Changes to websites and webpages (e.g., URLs, page names, etc.) can make one-hot encoding unstable. One-hot vectors can be large and sparse, and certain machine learning algorithms do not work well with this type of data.

SUMMARY

Therefore, what is needed are methods and systems that leverage advanced machine learning algorithms and techniques, including the application of time-decayed weighting, on user clickstream data to predict a likelihood that a user will initiate a subsequent future action—such as an interaction to a customer service center. Such predictions can then be advantageously employed to more efficiently manage resources and planning, such as availability of resources in advance of customer demand.

The invention, in one aspect, features a system for determining future user actions using time-based featurization of clickstream data. The system includes a server computing device with a memory for storing computer-executable instructions and a processor that executes the computer-executable instructions. The server computing device captures clickstream data corresponding to one or more web browsing sessions between one or more client computing devices and one or more web servers, the clickstream data for a web browsing session comprising a plurality of uniform resource locators (URLs) and one or more timestamps of the corresponding session. The server computing device extracts each unique URL from the clickstream data and converts the extracted unique URLs into tokens. The server computing device generates a frequency matrix based upon the tokens, the frequency matrix comprising for each token (i) a frequency of the token appearing in the unique URLs ("TF") and (ii) a log transform of an inverse of a ratio of number of distinct URLs that include the token over the number of unique URLs ("IDF"). The server computing device generates a latent feature vector for each unique URL using non-negative matrix factorization based upon the frequency matrix. The server computing device merges the latent feature vectors and the clickstream data into an aggregate clickstream vector set for a user of the one or more client computing devices, the aggregate clickstream vector set comprising, for each latent feature vector: a user identifier, the corresponding URL, a time difference between an event time value and a time value associated with the URL, and the latent feature vector. The server computing device assigns time-decayed weight values to each latent feature vector in the aggregate clickstream vector set, the time-decayed weight values based upon the time difference for the latent feature vector and a time decay constant. The server computing device combines the time-decayed latent feature vectors to generate a clickstream embedding for the user. The server computing device executes a machine learning model using the clickstream embedding as input to generate one or more predicted actions of the user.

The invention, in another aspect, features a computerized method of determining future user actions using time-based featurization of clickstream data. A server computing device captures clickstream data corresponding to one or more web browsing sessions between one or more client computing devices and one or more web servers, the clickstream data for a web browsing session comprising a plurality of uniform resource locators (URLs) and one or more timestamps of the corresponding session. The server computing device extracts each unique URL from the clickstream data and converts the extracted unique URLs into tokens. The server computing device generates a frequency matrix based upon the tokens, the frequency matrix comprising for each token (i) a frequency of the token appearing in the unique URLs ("TF") and (ii) a log transform of an inverse of a ratio of number of distinct URLs that include the token over the number of unique URLs ("IDF"). The server computing device generates a latent feature vector for each unique URL using non-negative matrix factorization based upon the frequency matrix. The server computing device merges the latent feature vectors and the clickstream data into an aggregate clickstream vector set for a user of the one or more client computing devices, the aggregate clickstream vector set comprising, for each latent feature vector: a user identifier, the corresponding URL, a time difference between an event time value and a time value associated with the URL, and the latent feature vector. The server computing device assigns time-decayed weight values to each latent feature vector in the aggregate clickstream vector set, the time-decayed weight values based upon the time difference for the latent feature vector and a time decay constant. The server computing device combines the time-decayed latent feature vectors to generate a clickstream embedding for the user. The server computing device executes a machine learning model using the clickstream embedding as input to generate one or more predicted actions of the user.

Any of the above aspects can include one or more of the following features. In some embodiments, converting the extracted unique URLs into tokens comprises removing one or more special characters in the unique URLs. In some embodiments, converting the extracted unique URLs into tokens comprises detecting one or more common tokens in the unique URLs and removing the common tokens from the unique URLs. In some embodiments, the time value comprises a time at which the client computing device activated the URL. In some embodiments, the event time value is a current time value.

In some embodiments, the one or more predicted actions comprise a purchase transaction, a request for information, an appointment request, an account setup transaction, or a customer service interaction. In some embodiments, the server computing device trains the machine learning model using a different set of clickstream embeddings as input, the different set of clickstream embeddings generated using data from historical web browsing sessions associated with one or more other users. In some embodiments, the machine learning model is based upon one or more machine learning algorithms. In some embodiments, the one or more machine learning algorithms comprise a tree-based algorithm, a non-linear algorithm, or an ensemble algorithm. In some embodiments, the server computing device uses one or more outcomes associated with the generated one or more predicted actions of the user to re-train the machine learning model.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of an exemplary tokenization of URLs as performed by tokenization module.

FIG. 4 is a diagram of an exemplary tokenization table including time values, user identifiers and session identifiers as generated by tokenization module.

FIG. 5 is a diagram of an exemplary aggregate clickstream vector set as generated by embedding generation module.

DETAILED DESCRIPTION

Figure 1:
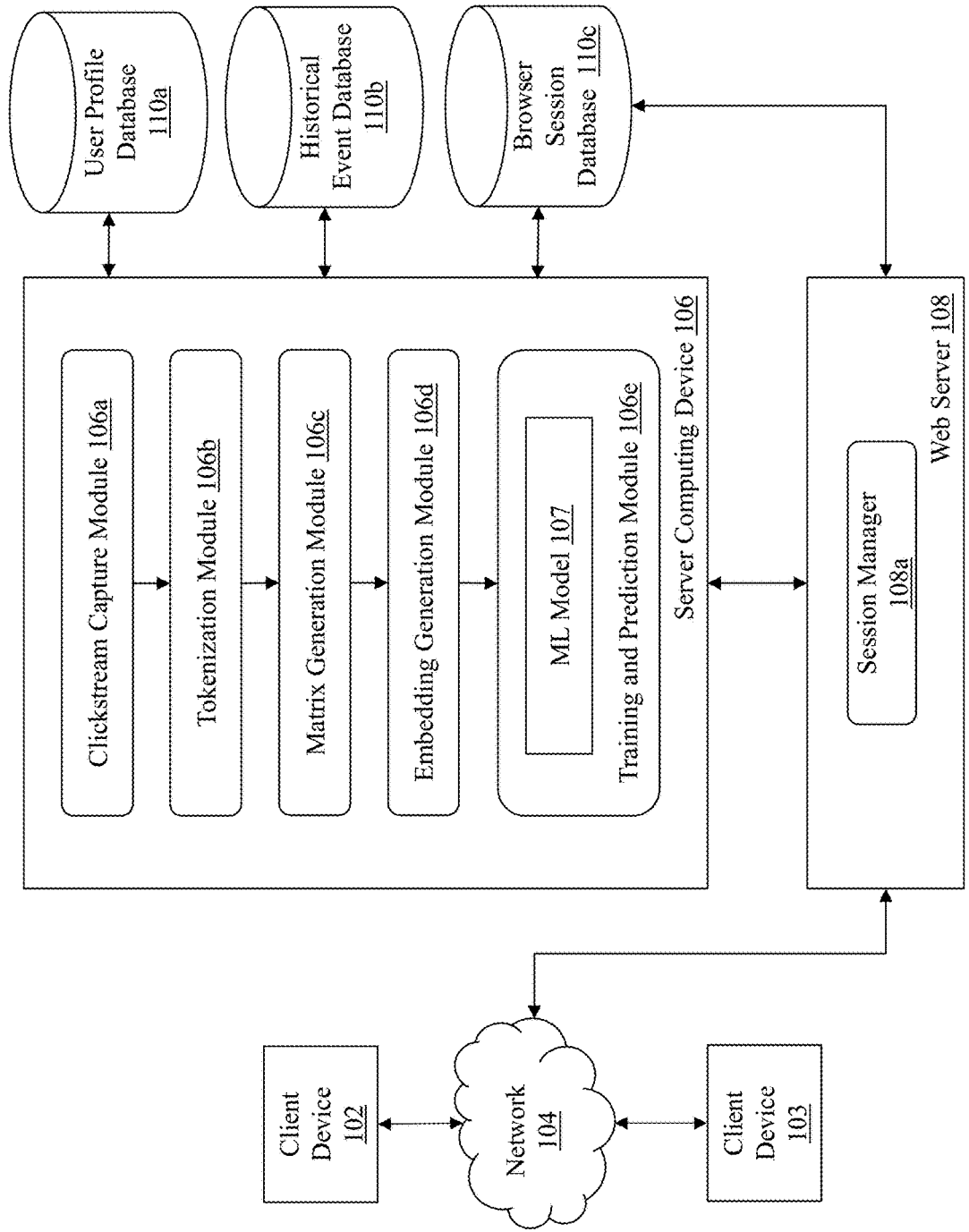
FIG. 1 is a block diagram of a system for determining future user actions using time-based featurization of clickstream data.

FIG. 1 is a block diagram of a system 100 of determining future user actions using time-based featurization of clickstream data. System 100 includes client computing device 102, client computing device 103, communication network 104, server computing device 106 that includes clickstream capture module 106a, tokenization module 106b, matrix generation module 106c, embedding generation module 106d, and training and prediction module 106e. Training and prediction module 106e includes machine learning model 107. System 100 further comprises web server computing device 108 that includes session manager 108a. System 100 also comprises a plurality of databases—including user profile database 110a, historical event database 110b, and browser session database 110c.

Client computing devices 102, 103 connect to communication network 104 in order to communicate with web server 108 to participate in one or more web browsing sessions. As can be appreciated, web server 108 can be configured to host one or more websites and/or connect to other computing devices that provide web-related content to client computing devices 102, 103. For example, client computing devices 102, 103 can establish a communication session with session manager 108a of web server 108 (e.g., via HTTP or HTTPS) using a uniform resource locator (URL) assigned to web server 108 and receive website content from web server 108. A user at client computing device 102, 103 can interact with (e.g., browse) the website by activating links and navigating through various pages of the website. In some embodiments, each page or section of the website is associated with a particular URL. In some embodiments, client computing devices 102, 103 are each coupled to an associated display device (not shown). For example, client computing devices 102, 103 can provide a graphical user interface (GUI) via the display device that is configured to receive input from a user of the corresponding device 102, 103 and to present output (e.g., website content) to that user. In some embodiments, client computing devices 102, 103 can be configured to connect to server computing device 106 via network 104.

Exemplary client computing devices 102, 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client computing devices 102, 103, it should be appreciated that system 100 can include any number of client computing devices.

Communication network 104 enables client computing devices 102, 103 to communicate with the web server 108. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for determining future user actions using time-based featurization of clickstream data as described herein. Server computing device 106 includes clickstream capture module 106a, tokenization module 106b, matrix generation module 106c, embedding generation module 106d, and training and prediction module 106e that execute on the processor of the server computing device 106. As mentioned above, training and prediction module 106e includes machine learning model 107. In some embodiments, modules 106a-106e and model 107 are specialized sets of computer software instructions programmed onto one or more dedicated processors in server computing device 106 and can include specifically-designated memory locations and/or registers for executing the specialized computer software instructions.

Although modules 106a-106e and model 107 are shown in FIG. 1 as executing within the same server computing device 106, in some embodiments the functionality of the modules 106a-106e and model 107 can be distributed among a plurality of server computing devices. As shown in FIG. 1, server computing device 106 enables modules 106a-106e and model 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 106a-106e and model 107 is described in detail throughout the specification.

In some embodiments, machine learning model 107 is an artificial intelligence framework configured to receive aggregated clickstream feature embeddings (that are representative of user clickstream activity) as input and generate a prediction of a future user action based upon the aggregated clickstream feature embeddings. For example, machine learning model 107 can comprise one or more machine learning frameworks or algorithms that are executed on the clickstream feature embeddings to determine predictions of likely user actions based upon the input. Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), and others. As can be appreciated, machine learning model 107 can be trained on existing clickstream activity data and correlated known user actions in order to enhance the accuracy of the prediction values generated by model 107. Also, as additional clickstream data and related subsequent user actions are collected by system 100 over time, this additional data can be used to re-train embedding model 107 for a further increase in accuracy and performance.

As can be appreciated, prediction data generated by model 107 is actionable and can be utilized by other components of system 100 to interface with client computing devices 102, 103 and/or other devices (not shown) in a manner that leverages the insight gained through the prediction. For example, model 107 may analyze a clickstream feature embedding for activity data associated with a particular user and predict that the user is likely to request information about opening an account in the near future. In response to this insight, server computing device 106 can instruct web server 108 and/or another computing device to generate a notification message deliverable to client computing device 102, 103 of the user. The notification message can comprise information about opening an account (e.g., frequently asked questions, contact information, etc.) that is proactively delivered to the user. In another example, model 107 may predict that the user is likely to schedule an in-person or virtual appointment with a customer service representative in the next thirty days. In response, server computing device 106 can provide the prediction to a customer service scheduling application that manages staffing and availability of representatives to ensure that there is sufficient coverage on the predicted timeframe so that the customer's appointment request can be serviced.

Web server 108 is a computing device (or set of computing devices) to which client computing devices 102, 103 can connect to retrieve and display digital content items (such as web pages). Web server 108 is a combination of hardware, including one or more special-purpose processors and one or more physical memory modules, and specialized software modules (such as session manager 108a) that are executed by a processor of web server 108. Typically, a website comprises a plurality of visual and non-visual elements that make up the content transmitted and displayed to a user when, e.g., browser software on client computing devices 102, 103 connects to web server 108 via communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). As can be understood, in some embodiments each page of a website is associated with a particular URL that identifies the page's location and provides a mechanism for retrieving the page for display on client computing devices 102, 103. Session manager 108a is configured to establish browsing sessions with client computing devices 102, 103 and record session-related information (such as pages visited, URLs accessed, timestamps, page sequencing, and the like) for each user/client device. In some embodiments, session manager 108a records the browsing session information in browser session database 110c.

Databases 110a-110c are located on a computing device (or in some embodiments, on a set of computing devices) coupled to server computing device 106 and/or web server 108 and databases 110a-110c are configured to receive, generate, and store specific segments of data relating to the process of determining future user actions using time-based featurization of clickstream data as described herein. In some embodiments, all or a portion of databases 110a-110c can be integrated with server computing device 106, web server 108, or be located on a separate computing device or devices. Databases 110a-110c can comprise one or more databases configured to store portions of data used by the other components of system 100 as will be described in greater detail below.

In some embodiments, user profile database 110a comprises user profile information for a plurality of users of system 100; typically, each user is associated with one or more client computing devices 102, 103. User profile information can include, but is not limited to, identification information (e.g., user identifiers, account numbers) demographic information, financial information, device information (e.g., IP address, MAC address, etc. of client computing device 102, 103), historical interaction information (e.g., purchases, transactions, events), and the like.

In some embodiments, historical event database 110b comprises historical user action/user event data that may be correlated to user profiles as stored in user profile database 110a and certain web browsing activity as stored in browser session database 110c. Generally, historical event database 110b can comprise information about prior actions of users (e.g., purchases, requests for information, appointments, account setup, transactions, customer service interactions, etc.) that may be relevant to the user's clickstream and web browsing history. For example, a user that accessed URLs relating to password reset instructions, online account activation FAQs, and other similar topics during a web browsing session may not have been able to find the information they were seeking. As a result, within a short time (e.g., 10 minutes) after participating in the web browsing session, the user may call a customer service center or initiate a virtual support chat session. Therefore, the specific URLs accessed by the user during the web browsing session may be associated with a strong likelihood of subsequent customer service interactions (e.g., calls, web chats, etc.). In certain instances, historical data about clickstreams and related known user events (also called a training set) can be provided as input to train machine learning model 107 so that model 107 can generate predictions of future user events—where subsequent input to the model 107 comprises clickstream data for live or recently-concluded web browsing sessions conducted by other users. Further information about training and execution of machine learning model 107 is provided later in the specification.

In some embodiments, browser session database 110c comprises browsing information for web sessions established between client computing devices 102, 103 and web server 108. Browsing information can include, but is not limited to, user identifiers, session metadata (e.g., device identifiers, network information, browser type), URLs, timestamps, and the like. As an example, for each webpage that a particular user visits during a web session, browser session database 110c can store data such as the URL(s) accessed, a timestamp when a corresponding URL was accessed, an identifier of the user and/or client computing device 102, 103 on which the URL was accessed, and a response from the user and/or client computing device 102, 103 with respect to the webpage (e.g., interaction, view time, scroll time, etc.).

Figure 2:
FIG. 2 is a flow diagram of a computerized method of determining future user actions using time-based featurization of clickstream data.

FIG. 2 is a flow diagram of a computerized method 200 of determining future user actions using time-based featurization of clickstream data, using the system 100 of FIG. 1. As mentioned above, users at one or more client computing devices 102, 103 participate in web browsing sessions with web server 108 and session manager 108a records relevant web browsing information, such as user identifiers, timestamps, URLs accessed, and the like. Session manager 108a transmits the web browsing information to browser session database 110b for storage. Clickstream capture module 106a of server computing device 106 captures (step 202) clickstream data corresponding to one or more web browsing sessions from, e.g., browser session database 110b. In some embodiments, module 106a can retrieve web browsing session data from database 110b periodically (e.g., via a batch job, push and/or pull mechanisms, or other similar data retrieval techniques). In other embodiments, module 106a can receive web browsing session data in real time or near real time (e.g., as client computing devices 102, 103 are establishing and conducting web browsing sessions with web server 108).

After capturing the clickstream data, tokenization module 106b of server computing device 106 extracts (step 204) the unique URLs from the clickstream data and converts the unique URLs into tokens. As can be appreciated, tokenization generally refers to a process where the unique URLs extracted from the clickstream data are broken down into subcomponents called tokens. In some embodiments, module 106b parses each unique URL extracted from the clickstream data into one or more tokens, each token comprising a discrete segment of the corresponding unique URL. In some embodiments, the set of unique URLs from the clickstream data is associated with a given user, e.g., based upon activity occurring between a client computing device associated with the user and web server 108. For example, a user may have accessed the same URL at two different times during the same session and/or in two different sessions. While each occurrence of the URL is retained as part of the user's clickstream activity, for the purposes of calculating TF-IDF and NMF models (as described below), module 106b can determine one or more duplicate URLs in the clickstream dataset and extract only the unique URLs from the clickstream data so that each URL used by matrix generation module 106c to generate the TF-IDF frequency matrix and NMF latent feature vectors is unique.

URLs typically contain certain non-alphanumeric characters (e.g., forward slashes, spaces, question marks) that denote separation between various parts of the URL. Tokenization module 106b can split the URL into separate sections according to the position of these non-alphanumeric characters in the overall URL string. An example tokenization of URLs by module 106b is provided in FIG. 3—as shown therein, an example URL in column 302 is converted into tokens in column 304.

As part of the tokenization process, module 106b can remove certain tokens that are considered generic or otherwise not relevant. For example, module 106b can remove standard types of tokens, such as 'http', 'com' or context-specific tokens that may not be relevant, such as 'abc'. In some cases, URLs can contain certain keywords that may require further processing. For example, if a user enters search terms and executes a search in a given web page, the web page that displays the search results may correspond to a URL that contains the specific search keywords (e.g., " . . . /results.html?search_keywords=book&Smith."). Upon parsing the URL, module 106b can identify the search keywords 'book' and 'Smith' in the URL (e.g., because they follow the term 'search_keywords' in a specific syntax). These search terms can be included as tokens or excluded as tokens, depending on the particular needs and/or structure of the featurization and prediction techniques described herein.

Once the set of unique URLs has been tokenized as described above, matrix generation module 106c generates (step 206) a frequency matrix based upon the tokens. In some embodiments, module 106c applies a term frequency-inverse document frequency (TF-IDF) algorithm to the token dataset to generate the frequency matrix. TF-IDF is a popular method for determining the significance and/or relevance of each item in a particular dataset, weighted by the term's occurrence or frequency in the entire dataset. Matrix generation module 106c can generate a multidimensional feature set that corresponds to the TF-IDF for the tokens across all URLs in the clickstream data for a particular user.

Generally, it should be appreciated that the higher the value of TF x IDF is, the more relevant that token is to the subsequent user action predicted by machine learning model 107. For example, a high weight in TF-IDF is reached by a high term frequency (in the given document) and a low document frequency of the term in the whole collection of documents. For example, the tokens 'transfer' and 'setupassettransfer' can indicate that the user at client computing device 102, 103 was attempting to perform a particular transaction—i.e., an asset transfer—during a prior web browsing session, while the token itgw' can indicate that the user at client device 102, 103 was interacting with a certain module or web application (without specifying further detail).

In some embodiments, the first value ("TF" or "term frequency") is the frequency at which the token appears in the unique URLs. The second value ("IDF" or "inverse document frequency") is a log transform of the inverse of the following ratio:

Number of unique URLs/Number of unique URLs that include the token

FIG. 4 is a diagram of exemplary TF-IDF calculations for tokens in the clickstream dataset. As shown in FIG. 4, each token (column 402) is assigned a TF value (column 404) and an IDF value (column 406) using the above algorithm. Additional information about the application of TF-IDF is available from en.wikipedia.org/wiki/Tf-idf. In some embodiments, module 106c uses sklearn.feature extraction.text.TFIDFVectorizer (available from scikit-learn.org/stable/modules/generated/sklearn.feature_extraction.text.TfidfVectorizer.html) to extract the TF-IDF features. For example, if the input tokens below are fed in to module 106c as an input, module 106c could return a vector representation as shown below:

Input: toa abc ftgw appt schedule newaccount
Output: [0, 0, 0, 0, 0.4789, 0, 0, 0, 0, 1.46278. . . .]

The output is generally an n-dimensional vector, where n would be the number of tokens in the set (all the tokens that were ever used in all the URLs put together).

Next, embedding generation module 106d generates (step 208) a latent feature vector for each unique URL in the clickstream data, based upon the frequency matrix generated by module 106c in the prior step. As can be appreciated, the application of a TF-IDF algorithm to the set of tokens typically results in a multidimensional feature set having a lot of features, many of which may be redundant or irrelevant for the purposes of user action prediction. Therefore, matrix generation module 106c can refine the TF-IDF multidimensional feature set using a non-negative matrix factorization (NMF) algorithm—which can further reduce the number of dimensions of the feature set to be used for the machine learning model 107. Generally, an NMF algorithm models the multidimensional feature set of TF-IDF as a dot product of weights and a latent feature vector. The NMF latent features thus represent abstract 'topic' importance based on similar and co-occurring tokens. Additional information about the application of NMF is available at en.wikipedia.org/wiki/Non-negative matrix factorization. In some embodiments, module 106c uses sklearn.decomposition.NMF (available from scikit-learn.org/stable/modules/generated/sklearn.decomposition.NMF.html) module to extract the NMF Features. For example, NMF takes in TF-IDF vectors from the previous step as an input and outputs a condensed feature vector for a URL as shown below:

Input: [0, 0, 0, 0, 0.4789, 0, 0, 0, 0, 1.46278. . . .]
Output: [10.372, 0.7252, 4.362, 1.26, 2.364]

The input dimensions are n (number of tokens in the entire dataset) per URL and the output dimensions are, in this example, five per URL.

Embedding generation module 106d merges (step 210) the latent feature vectors generated by module 106c and the clickstream data into an aggregate clickstream vector set. In some embodiments, each item in the aggregate clickstream vector set comprises a user identifier, the corresponding URL, a time difference value (zit) representing the difference between an event time and a time value at which the URL was accessed or activated, and the latent feature vector for the URL. FIG. 5 is a diagram of an exemplary aggregate clickstream vector set as generated by module 106d. As shown in FIG. 5, each item in the vector set includes a user identifier (column 502), a URL from the clickstream data (column 504), a time difference value (column 506), and the associated latent feature vector (column 506) generated in step 208. As explained herein, capturing a time value associated with when a user accessed a given URL is useful because more recent clickstream activity may be more relevant or useful in predicting future user actions than older clickstream activity. In some embodiments, the timestamp can be captured by module 106a and used by system 100 to determine the time difference value that is used to generate the time-decayed weight values for the latent feature vectors. The user identifier can correspond to the particular user and/or client computing device 102, 103 that accessed a given URL. As can be appreciated, in some embodiments the clickstream data can be captured during a single browsing session and/or multiple browsing sessions.

Embedding generation module 106d assigns (step 212) time-decayed weight values to each latent feature vector in the aggregate clickstream vector set using the time difference value for the corresponding URL. As can be appreciated, time decay provides important information for the accuracy of predictions of future user actions because a generally-understood proposition is that clickstream data generated very recently is more predictive of a user's subsequent actions than clickstream data that was generated farther in the past. For example, a person that has visited a password reset page within the last five minutes is more likely to call customer support in the next few hours or days than a person that had visited the same password reset page six months ago.

To generate time-decayed weight values to a latent feature vector, module 106d can use an exponential decay equation:

$$embedding_{time\_decayed} = embedding * e(-\Delta t/T)$$

where $\Delta t$ is the time difference between the current date (or event date for historic clickstream data) and the date that the URL was accessed, and T is the decay constant. It should be appreciated that other types of decay functions can be used within the scope of the technology, however in some embodiments exponential decay is simpler to tune, and avoids the risk of negative or infinite values—which can produce invalid or inaccurate embedding weights.

Once the latent feature vectors are weighted using the time-decayed weight values, in some embodiments, embedding generation module 106d can combine (step 214) the weighted latent feature vectors to generate a clickstream embedding comprising a representation of the clickstream activity for a given user based upon the pages they visit, via the following equation:

$$\text{clickstream\_embedding}_u = \sum_{page\ p}^{p \in P} \text{embedding}_{time\_decayed}^p \ \forall \text{user} \in \text{Population}$$

Upon generating the clickstream embedding for a given user, training and prediction module 106e of server computing device receives the clickstream embedding. As mentioned previously, training and prediction module 106e can use clickstream embeddings for users generated from historical web browsing sessions and related known user actions to train machine learning model 107 to be able to generate predictions of future actions of users. Also, once machine learning model 107 is trained, module 106e can use a clickstream embedding generated from newly-captured clickstream data for a particular user as input to execute (step 216) the trained machine learning model in order to generate predictions of one or more future actions of the user associated with the clickstream embedding. In one example, machine learning model 107 comprises a classification model that uses an algorithmic framework to receive a specific user's clickstream embedding as input and generate an output value that corresponds to a predicted user action based on the embedding. As stated above, machine learning model 107 can comprise any of a number of different machine learning frameworks, such as: nearest neighbor, logistic regression, ridge regression, Random Forest, extra trees, ensemble voting classification, stacked classification, gradient boosting on decision trees, feed forward neural networks, and others.

It should be appreciated that, in some embodiments, training of machine learning model 107 on historical data can be performed independently from execution of machine learning model 107 to generate predictions of future user actions. For example, training and prediction module 106e can be configured to periodically train and/or re-train machine learning model 107 based upon clickstream data and user actions that are collected over time. Then, module 106e can deploy the updated, trained machine learning model 107 for execution on other clickstream data that is currently being captured for live or recently-concluded user web browsing sessions.

In some embodiments, the predictions generated by execution of machine learning model 107 can comprise a likelihood that certain events associated with user requests, user interactions, user transactions, and the like will occur in a predetermined time frame. For example, machine learning model 107 can generate a probability value that can be correlated to certain specific events and the likelihood that those events will take place. In some embodiments, the predictions generated by machine learning model 107 can be bounded according to a timeframe—e.g., the likelihood that an action will take place within 30 days of the current date, etc. In some embodiments, the clickstream embedding(s) used as input to execution of model 107 can be bounded to a specific timeframe—e.g., analyze web browsing session data for sessions that occurred in the last 30 days, etc.

Upon generating the predicted user action(s), training and execution module 106e can transmit the predicted actions to one or more other computing devices, such as user analytics systems, scheduling systems, customer service reporting systems, and other types of systems that can use the predictions to take one or more actions in response to the predictions. The following section provides an exemplary use case for online appointment scheduling prediction that illustrates the technical advantages and improvements of the systems and methods described herein.

As can be appreciated, the ability to predict user actions is very important in the customer service context for a variety of reasons, including forecasting a future volume of customer service requests or interactions so that adequate resources can be made available to handle such requests. One example is the need to accurately predict whether a customer is likely to request a virtual or in-person appointment during a future period of time so that representatives and other resources can be prepared to handle the appointment requests and conduct the appointments at the appropriate time.

In this example, system 100 is configured to capture clickstream data associated with one or more users for a given time period (e.g., 30 days or one month). System 100 uses this data as described above to generate time-decayed clickstream embeddings that are used as input to machine learning model 107 to generate a prediction of whether one or more of the users will schedule an appointment in the forthcoming 30 days. For example, the clickstream data may comprise certain set(s) of webpages that directly relate to online appointment scheduling and/or are a high predictor (e.g., based on historical clickstream and event data) that a user is likely to request an online appointment in the next 30 days. Using the techniques described herein, the machine learning model 107 generates a prediction value that can be used as an indicator of either (i) scheduling an online appointment is likely in the next 30 days or (ii) scheduling an online appointment is unlikely in the next 30 days. In some embodiments, the predicted values for specific sets of users can be aggregated into a global signal that indicates, e.g., a percentage of users from an overall data set that are likely or unlikely to request an online appointment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for determining future user actions using time-based featurization of clickstream data, the system comprising a server computing device with a memory for storing computer-executable instructions and a processor that executes the computer-executable instructions to:
- capture, by a server computing device, clickstream data corresponding to one or more web browsing sessions between one or more client computing devices and one or more web servers, the clickstream data for a web browsing session comprising a plurality of uniform resource locators (URLs) and one or more timestamps of the corresponding session;
- extract, by the server computing device, each unique URL from the clickstream data and convert the extracted unique URLs into tokens;
- generate, by the server computing device, a frequency matrix based upon the tokens, the frequency matrix comprising for each token (i) a frequency of the token appearing in the unique URLs ("TF") and (ii) a log transform of an inverse of a ratio of number of distinct URLs that include the token over the number of unique URLs ("IDF");
- generate, by the server computing device, a latent feature vector for each unique URL using non-negative matrix factorization based upon the frequency matrix;
- merge, by the server computing device, the latent feature vectors and the clickstream data into an aggregate clickstream vector set for a user of the one or more client computing devices, the aggregate clickstream vector set comprising, for each latent feature vector: a user identifier, the corresponding URL, a time difference between an event time value and a time value associated with the URL, and the latent feature vector;
- assign, by the server computing device, time-decayed weight values to each latent feature vector in the aggregate clickstream vector set, the time-decayed weight values based upon the time difference for the latent feature vector and a time decay constant;
- combine, by the server computing device, the time-decayed latent feature vectors to generate a clickstream embedding for the user; and
- execute, by the server computing device, a machine learning model using the clickstream embedding as input to generate one or more predicted actions of the user.

2. The system of claim 1, wherein converting the extracted unique URLs into tokens comprises removing one or more special characters in the unique URLs.

3. The system of claim 1, wherein convert the extracted unique URLs into tokens comprises detecting one or more common tokens in the unique URLs and removing the common tokens from the unique URLs.

4. The system of claim 1, wherein the time value comprises a time at which the client computing device activated the URL.

5. The system of claim 4, wherein the event time value is a current time value.

6. The system of claim 1, wherein the one or more predicted actions comprise a purchase transaction, a request for information, an appointment request, an account setup transaction, or a customer service interaction.

7. The system of claim 1, wherein the server computing device trains the machine learning model using a different set of clickstream embeddings as input, the different set of clickstream embeddings generated using data from historical web browsing sessions associated with one or more other users.

8. The system of claim 1, wherein the machine learning model is based upon one or more machine learning algorithms.

9. The system of claim 8, wherein the one or more machine learning algorithms comprise a tree-based algorithm, a non-linear algorithm, or an ensemble algorithm.

10. The system of claim 1, wherein the server computing device uses one or more outcomes associated with the generated one or more predicted actions of the user to re-train the machine learning model.

11. A computerized method of determining future user actions using time-based featurization of clickstream data, the method comprising:
- capturing, by a server computing device, clickstream data corresponding to one or more web browsing sessions between one or more client computing devices and one or more web servers, the clickstream data for a web browsing session comprising a plurality of uniform resource locators (URLs) and one or more timestamps of the corresponding session;
- extracting, by the server computing device, each unique URL from the clickstream data and converting the extracted unique URLs into tokens;
- generating, by the server computing device, a frequency matrix based upon the tokens, the frequency matrix comprising for each token (i) a frequency of the token appearing in the unique URLs ("TF") and (ii) a log transform of an inverse of a ratio of number of distinct unique URLs that include the token over the number of unique URLs ("IDF");
- generating, by the server computing device, a latent feature vector for each unique URL using non-negative matrix factorization based upon the frequency matrix;
- merging, by the server computing device, the latent feature vectors and the clickstream data into an aggregate clickstream vector set for a user of the one or more client computing devices, the aggregate clickstream vector set comprising, for each latent feature vector: a user identifier, the corresponding URL, a time difference between an event time value and a time value associated with the URL, and the latent feature vector;
- assigning, by the server computing device, time-decayed weight values to each latent feature vector in the aggregate clickstream vector set, the time-decayed weight values based upon the time difference for the latent feature vector and a time decay constant;
- combining, by the server computing device, the time-decayed latent feature vectors to generate a clickstream embedding for the user; and
- executing, by the server computing device, a machine learning model using the clickstream embedding as input to generate one or more predicted actions of the user.

12. The method of claim 11, wherein converting the extracted unique URLs into tokens comprises removing one or more special characters from the unique URLs.

13. The method of claim 11, wherein converting the extracted unique URLs into tokens comprises detecting one or more common tokens in the unique URLs and removing the common tokens from the unique URLs.

14. The method of claim 11, wherein the time value comprises a time at which the client computing device activated the URL.

15. The method of claim 14, wherein the event time value is a current time value.

16. The method of claim 11, wherein the one or more predicted actions comprise a purchase transaction, a request for information, an appointment request, an account setup transaction, or a customer service interaction.

17. The method of claim 11, wherein the server computing device trains the machine learning model using a different set of clickstream embeddings as input, the different set of clickstream embeddings generated using data from historical web browsing sessions associated with one or more other users.

18. The method of claim 11, wherein the machine learning model is based upon one or more machine learning algorithms.

19. The method of claim 18, wherein the one or more machine learning algorithms comprise a tree-based algorithm, a non-linear algorithm, or an ensemble algorithm.

20. The method of claim 11, wherein the server computing device uses one or more outcomes associated with the generated one or more predicted actions of the user to re-train the machine learning model.

\* \* \* \* \*